(No Model.)
A. ANDRÉ, FILS.
PURIFICATION OF MINERAL OILS.
No. 284,589. Patented Sept. 11, 1883.
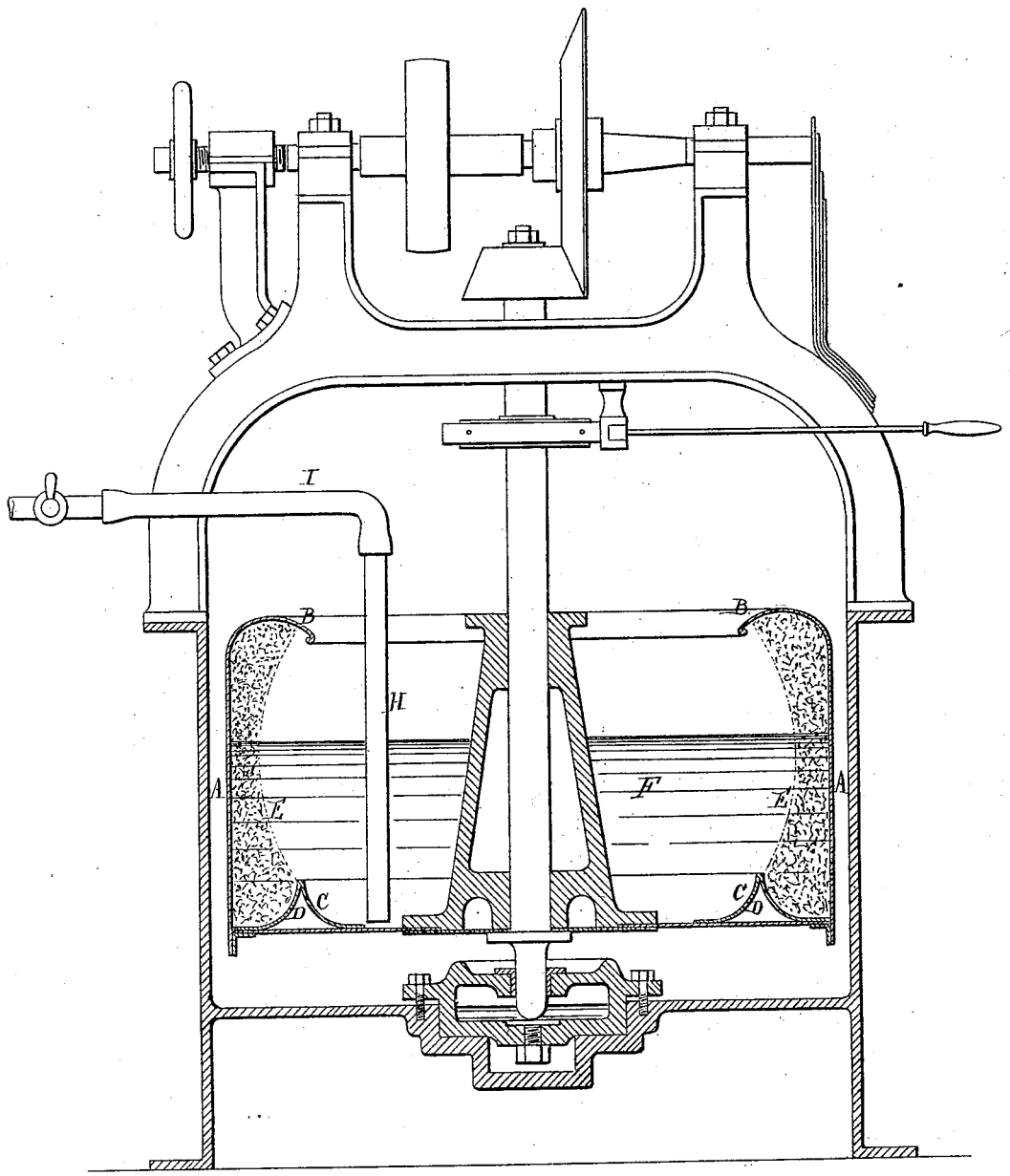
WITNESSES:
INVENTOR:

UNITED STATES PATENT OFFICE.

ALEXANDRE ANDRÉ, FILS, OF PARIS, FRANCE.

PURIFICATION OF MINERAL OILS.

SPECIFICATION forming part of Letters Patent No. 284,589, dated September 11, 1883.

Application filed August 9, 1883. (No model.) Patented in France July 13, 1883.

*To all whom it may concern:*

Be it known that I, ALEXANDRE ANDRÉ, Fils, a citizen of the French Republic, residing at Paris, France, have invented certain Improvements in Methods, and Apparatus for Recovering Heavy Oils from the Residues of Distillation, of which the following is a specification.

The ordinary mode of treating mineral oils— such as petroleum, naphtha, bog-head, schist, &c.—comprises two distinct operations—namely, the distillation and the purifying or refining. The distillation is effected either by direct heat or by superheated steam, according to the density of the oil or substance treated. In general, after the distillation to recover the lighter products and illuminating-oils there remains a residual product, more or less important and more or less rich in oils suited for lubricating purposes. The purification and refining of all these oils consist in first treating them with strong sulphurous acid and then washing with water charged with caustic soda. Certain crude oils, particularly the Caucasian petroleums, yield by distillation only about twenty-eight to thirty-five per centum of light and illuminating oils. The residuum from this first distillation—distilled by means of superheated steam—yields about thirty-five per centum of lubricating-oils, which is purified by the usual means stated above. There then remains in the still a very fluid tar, which is rich in lubricating-oil, but which cannot be extracted by distillation without decomposition. The above method, especially where it concerns the treatment of naphtha and petroleum, is not only long and costly, but it produces a very low yield of lubricating-oil, hardly one-third of the substance treated.

My process avoids these inconveniences. It is very simple, expeditious, cheap, and, above all, effects a yield of lubricating-oil equal to nearly four-fifths of the crude product treated. In treating the residues for lubricating-oils I still employ the purifying and refining process with acid; but I do away entirely with the second distillation. I replace the latter by a treatment that is substantially mechanical. In other words, I employ centrifugal force, developed in a turbine somewhat similar to that used in sugar-making. I have shown my apparatus in the accompanying drawing, the figure being a vertical mid-section of the same, and I will hereinafter describe it with reference to said figure. As I have said, I still employ the acid-purifying process. The acid is poured onto the residual product, which is contained in a lead-lined tank, and is agitated by means of a mechanical agitator, or by jets of air. The proportion of acid employed will vary from ten to twenty-five per centum, according to the quality of oil treated and the degree of purity desired. After the mass is agitated it is allowed to rest some minutes to permit some portion of the resinous substances produced by the action of the acid to deposit the liquid, is then decanted and the acid neutralized, and is then introduced directly into the apparatus shown in the drawing, and which I will now describe.

A is the panier or basket, mounted to rotate on a vertical axis. This panier has a tight or non-perforated peripheral wall, and an overhanging flange, B, at its top. It may or may not have a cover.

C is a curved annular rib, that rises from the bottom of the panier with its concavity toward its axis, and D is a similar flange, exterior to C, and having its concavity turned toward the periphery of A.

When the panier containing the liquid residue is rapidly rotated, the resinous impurities E, having a greater density, are thrown out by the centrifugal force and attach themselves, as shown, to the wall of the panier, while the purified oil F remains in the center. The annular flange C facilitates the projection of the resinous substance against the wall of the panier, and the flange D assists in retaining it there. The overhanging flange B performs the same service at the top. After the separation of the oil F from the resinous matter E the oil may be drawn off through pipes H I by a siphon, pump, or other means.

The resinous matter may be removed from the wall of the turbine by scrapers, or in any way desired.

It may be advisable sometimes to remove the oil while the machine is yet in motion, in order to prevent the more liquid portions of the matter E from flowing back and mixing with the oil. After removing the resinous and tarry matter E from the panier it may sometimes be treated to advantage in a filter-press to extract the small remaining portion of oil.

As before stated, I obtain by my process a yield of lubricating-oil equal to about eighty per centum of the residual product treated.

Having thus described my invention, I claim—

1. The herein-described method of separating the heavy oils from the residuum from the first distillation of mineral oils without decomposition, which consists in subjecting the same to centrifugal force, whereby the resinous matter is separated from the oil by reason of its greater density, substantially as set forth.

2. The herein-described method of treating the residuum from the distillation of mineral oils in order to separate the heavy oil in the same from the resinous and tarry matters, which consists in first subjecting said residuum to a purifying process with sulphuric acid, as herein described, and then subjecting this purified product to centrifugal action, whereby the resinous matter is separated from the oil by reason of its greater density, substantially as set forth.

3. An apparatus for separating the oil from the resinous matter in the residuum obtained by the first distillation of mineral oils, comprising a panier, A, provided with a non-perforated peripheral wall, an overhanging flange, B, and annular flanges C and D, and said panier mounted to rotate on its vertical axis, substantially as set forth.

In witness whereof I have hereunto signed my name in the presence of two subscribing witnesses.

ALEXANDRE ANDRÉ, FILS.

Witnesses:
   ROBT. M. HOOPER,
   AMAND RITTER.